May 20, 1947.   J. DE STEFANO   2,420,819
PORTABLE SEA WATER STILL
Filed Sept. 28, 1943   2 Sheets-Sheet 1
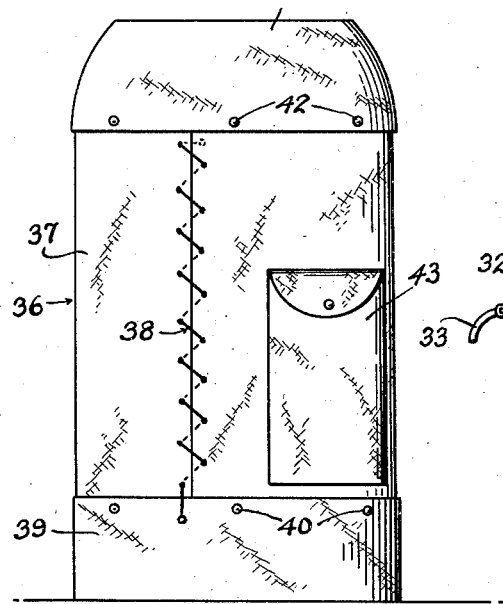
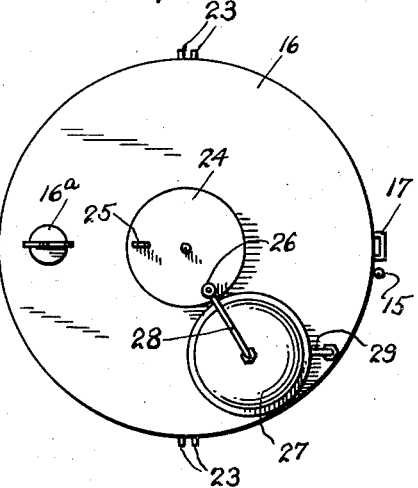
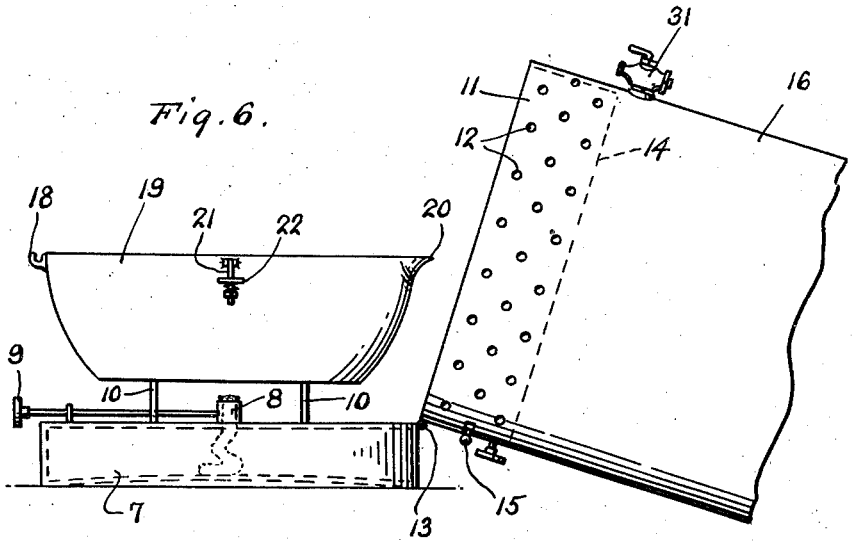
Inventor
John De Stefano
By Clarence A. O'Brien
and Harvey B. Jacobson
Attorneys

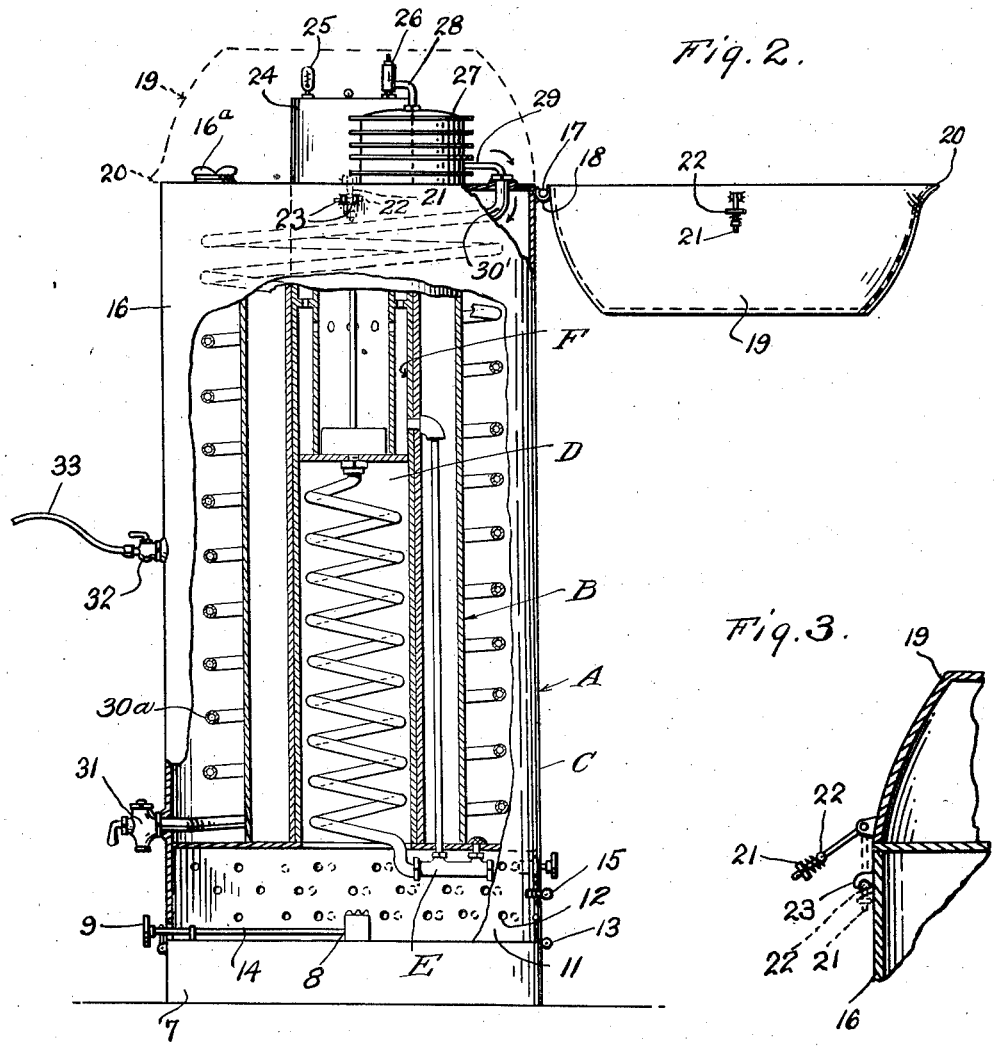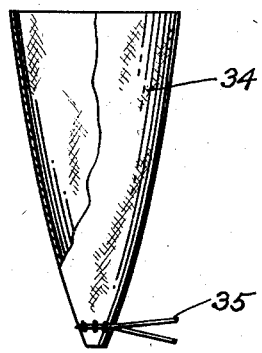

Patented May 20, 1947

2,420,819

UNITED STATES PATENT OFFICE 2,420,819

PORTABLE SEA WATER STILL

John De Stefano, Jackson Heights, N. Y.

Application September 28, 1943, Serial No. 504,183

1 Claim. (Cl. 202—163)

This invention relates to a portable type sea water distiller for emergency use on airplanes, rafts and lifeboats, the same being especially adapted for distilling salt water, whereby to prepare and condition it for palatable as well as safe human consumption.

By way of introduction, it is to be pointed out that the subject matter of this application for Letters Patent bears definite resemblance to an analogous structure disclosed and claimed in a co-pending application entitled "Sea water distilling device" filed by me in the Patent Office under date of July 8, 1943, and identified as Serial No. 493,909, and now patented August 21, 1945, under 2,383,294.

In order to pave the way for a proper understanding of the disclosure of the instant case, a brief résumé of Patent 2,383,294 follows.

The parent application just referred to covers a water distiller for emergency purposes comprising a main tank including inner and outer cylindrical walls defining therebetween a water and coil space, the inner wall defining a cylindrical chamber, a condenser coil mounted in said space and provided at its lower end with a discharge cock, a coil mounted in said chamber, a valved, screened connection between the lower end of said coil and the water space, a small tank mounted in the upper portion of said inner chamber and connected to the upper end of said coil, a cylinder therein, a float in said cylinder, a burner attached to the lower end of the main, and a condenser coil connected to the secondary cylinder and having its convolutions mounted in the water space of the first-named cylinder.

It is further to be noted that the co-pending parent application comprehends the use, on the top of the main tank, of a hollow extension identified as a steam dome. The steam is accumulated in this dome and then discharges by way of a valved pipe connected to a coil in said main tank, which coil serves to gravitate the condensation or distillate downwardly to the discharge cock or valve.

In the instant application I employ the same internal mechanism but utilize special adaptations and refinements which are regarded as improvements worthy of incorporation in a distiller of the type under advisement. One improvement has to do with the interposing between the steam dome and the distillate coil of an auxiliary dome, this being provided with external fins and constituting a radiator and serving to speed up the distilling results.

A further improvement has to do with the special adaptation and incorporation in the structure of a removable cover or lid of a convertible type, this constituting a basin for catching water, as a drinking receptacle, or as a pot to be placed on the burner for cooking food.

Another feature is a canvas or equivalent jacket made up of sections separably connected together to completely enclose and protect the structure.

Other features will no doubt become evident from the succeeding detailed description, drawings and claims.

In the drawings:

Figure 1 is an elevational view of the improved distiller, this being enclosed in the canvas sectional jacket.

Figure 2 is a view partly in section and partly in elevation with the jacket removed and showing the several improvements, as compared to the aforementioned patent perfected in accordance with my latest idea.

Figure 3 is a fragmentary detailed view showing the latching means for the detachable cover.

Figure 4 is a detail view of a temporarily usable canvas funnel for convenient filling purposes.

Figure 5 is a top plan view of the arrangement seen in Figure 2 with the cover or lid removed for convenience of illustration of parts.

Figure 6 is a fragmentary side elevational view showing the manner in which the tank is swung to one side to permit the burner to support the cover or lid when the latter is used for cooking purposes.

The base part of the structure is in the form of an alcohol or equivalent burner comprising a suitable tank 7, a wick 8 and an operating member 9 therefor. The burner is shown provided with a pair of upstanding prongs or pins 10 to serve a purpose to be hereinafter described. The skirt portion 11, which is provided with air holes 12, is hingedly connected to the burner as indicated at 13. Mounted within the skirt is an annular damper 14 which is suitably apertured and provided with an operating button or finger piece 15. The major part of the tank is denoted at 16 and is of vertically elongated cylindrical form. At its top and on one side it is provided with a keeper loop 17 to accommodate a hinge forming hook 18 on the pan-like lid or cover 19. This cover is adapted to swing over the top portion of the tank as shown in dotted lines in Figure 2. Opposite to the hinge hook it is provided with a pouring lip 20. Also on intervening diametrically opposite sides it is provided with pivoted latch pins 21 having spring-pressed detents 22 to engage in the keeper hooks 23 on the body of the tank. This keeps the cover closed as is obvious. Incidentally, and as pointed out, this cover is used as a receptacle for catching rain water, as a drinking receptacle, and as a cooking pan. It is detached when used in the latter capacity and placed on the pins 10 as shown in Figure 6. At this time the tank is swung over to one side to make way for this operation. At this stage I desire to touch upon certain structure on the interior of the tank which, in the main, is shown for purposes of completeness of illustration, the old features or parts being designated by reference letters and the added on improvement features being referred to by numerals. Referring to the structure it comprises an annular tank A for sea water and including inner B and outer C cylindrical walls disposed in spaced parallelism and defining a water reserve and condensing coil space between themselves, said inner wall functioning to define a cylindrical flue-like chamber, a condensing coil 30 being mounted in said water space and having its lower end opening through the lower portion of the outer cylindrical wall and provided with a distilled water discharge cock 31, the upper end of said condensing coil extending above the top of the main tank and there being a readily insertable and removable unit located in said flue-like chamber and comprising a perpendicular water holding and heating coil D disposed in the lower portion of the chamber and including a valve E having communication with the bottom of said main tank, an auxiliary water boiling and steam supply tank F of relatively small dimension connected to the upper end of said coil and located in the upper portion of said chamber and projecting from the top of the main tank to provide the aforementioned steam dome 24, the upper end of said condensing coil D being connected with the projecting upper end of said auxiliary tank, and said auxiliary tank being spaced from the inner wall to define a duct for air venting and heat circulating purposes.

The water which is placed in the tank A by way of a filler plug 16a is heated from the burner 8, as is obvious. Then, by way of coil D it is forced up into a steam dome 24 on the top of the tank. This dome is provided with a suitable steam pressure gauge 25 and a pressure actuated valve 26. Attention is directed at the time to the improved pre-condenser dome 27, this being a cylindrical container and having radiating fins. This second dome is also mounted above the tank A and is connected by way of the feeder pipe 28 with the valve 26. In addition it is connected at its bottom by way of a similar pipe 29 to the condensing coil located in the tank A. The upper end of the coil is denoted at 30 and the lower end at 30a. This discharges by way of a filter faucet 31 through one side of the tank just above the burner. The numeral 32 designates a drain cock and 33 a drain hose which is conveniently connected thereto.

The gist of the invention herein under advisement pertains to the auxiliary tank in the flue of the main tank and extending above the top of the main tank and defining the steam dome 24, this dome being provided with the steam pressure actuated and controlled valve 26 which feeds steam, after a certain pressure is developed in the steam dome 24, into the second dome, the pre-condenser dome 27, this by way of the discharge or feeder pipe 28. The pre-condenser dome 27 being located on the exterior and exposed to the atmosphere and having cooling fins is in effect a radiator and this discharges or feeds into the coil 30 by way of the short pipe line 29.

The aforementioned canvas funnel is indicated at 34 and its lower discharge end is provided with a draw string 35 whereby to permit said end to be open and closed at will. It can be closed up to serve as a dipper, or it can be opened up sufficiently to serve as a funnel to place water in the tank by way of the filler plug 16a in an obvious manner.

The canvas protective covering or jacket is indicated at 36. This comprises a main cylindrical section 37 whose overlapping edges are laced together as at 38. There is a cup-like bottom 39 attached to the body portion by snap fasteners 40. Then there is a similar cap section 41 fastened in place by snap fasteners 42. The numeral 43 designates a flap equipped side pocket to accommodate the funnel 34 and other accessories and tools in a suitable and convenient manner.

Secondary novelty is thought to reside in the provision of the triple section canvas jacket 36 provided with a suitable accessory pocket, this jacket being made up of sections 37, 39 and 41 suitably fastened together by quick separable fasteners. This is one phase of novelty.

The convertible lid or cover 19 with its detent equipped latches and its separable hinge connection with the tank is important. This is a water receptacle, a basin, and a cooking pan as well as a lid for protecting the parts when in the dotted line position shown in Figure 2.

I also desire to again stress the adoption and use of the condenser, that is, the fin equipped radiator element 27 on the top of the tank, this being connected for communication with the steam dome and also connected with the condenser coil arrangement 30 in the tank 16. It is felt that the presence of this element considerably expedites the distilling operation.

By making suitable cross reference to co-pending application Serial No. 493,909 as invited in the introductory portion of the specification a foundation for the internal construction of the tank 16 can be had. As far as this particular invention is concerned, it would be a needless repetition, perhaps, to include such parts. Moreover, the novelty resides broadly in the tank, heating means and dome and condenser arrangement, regardless of the internal parts. The claims are to be construed accordingly.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

A distiller of the class described comprising a burner base, a cylindrical vertically elongated tank supported on and rising from said base, the top of said tank being substantially flat and provided with filler means, water heating and elevating means on the interior of said tank adapted to be acted on by said burner, a concentric steam dome attached to and rising centrally above the median top portion of said tank, said steam dome being provided with a pressure actuated valve, a second dome having radiating fins mounted atop said tank eccentrically arranged in respect to said steam dome and also confined within the perimeter limits of said top, a communicating pipe connection between the second dome and valve, a distillate coil in said tank, and a second pipe connection between said second dome and distillate coil.

JOHN DE STEFANO.

REFERENCES CITED

The following references are of record in the file of this patent:

UNITED STATES PATENTS

| Number | Name | Date |
|---|---|---|
| 2,254,538 | Newman | Sept. 2, 1941 |
| 1,359,276 | Rushworth | Nov. 16, 1920 |
| 111,609 | Clarkson | Feb. 7, 1871 |
| 695,979 | Widmer | Mar. 25, 1902 |
| 1,154,775 | Johnson | Sept. 28, 1915 |
| 1,730,898 | Percival | Oct. 8, 1929 |
| 1,914,866 | Rodgers | June 20, 1933 |
| 1,395,485 | Duncan | Nov. 1, 1921 |
| 697,912 | Chase | Apr. 15, 1902 |
| 1,325,271 | Adams | Dec. 16, 1919 |
| 497,742 | Allderdice | May 16, 1893 |

FOREIGN PATENTS

| Number | Country | Date |
|---|---|---|
| 112,604 | Great Britain | Jan. 17, 1918 |